US010456743B2

(12) United States Patent
Yoshikawa et al.

(10) Patent No.: US 10,456,743 B2
(45) Date of Patent: Oct. 29, 2019

(54) EXHAUST-GAS TREATMENT EQUIPMENT AND GAS-CAPTURE-MATERIAL DETERIORATION-STATE ESTIMATING METHOD

(71) Applicant: HITACHI CHEMICAL COMPANY, LTD., Tokyo (JP)

(72) Inventors: Kohei Yoshikawa, Tokyo (JP); Masato Kaneeda, Tokyo (JP); Hidehiro Nakamura, Tokyo (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 37 days.

(21) Appl. No.: 15/756,427

(22) PCT Filed: Aug. 8, 2016

(86) PCT No.: PCT/JP2016/073290
§ 371 (c)(1),
(2) Date: Feb. 28, 2018

(87) PCT Pub. No.: WO2017/038397
PCT Pub. Date: Mar. 9, 2017

(65) Prior Publication Data
US 2018/0250629 A1 Sep. 6, 2018

(30) Foreign Application Priority Data
Aug. 31, 2015 (JP) .................................. 2015-170088

(51) Int. Cl.
*B01D 53/62* (2006.01)
*B01J 20/04* (2006.01)
(Continued)

(52) U.S. Cl.
CPC ............ *B01D 53/62* (2013.01); *B01D 53/04* (2013.01); *B01D 53/0407* (2013.01); *B01D 53/82* (2013.01); *B01J 20/04* (2013.01); *B01J 20/06* (2013.01); *B01J 20/20* (2013.01); *B01J 20/22* (2013.01); *B01J 20/28* (2013.01); *B01J 20/34* (2013.01); *F01N 3/08* (2013.01);
(Continued)

(58) Field of Classification Search
CPC combination set(s) only.
See application file for complete search history.

(56) References Cited

U.S. PATENT DOCUMENTS 6,901,743 B2 * 6/2005 Asanuma .................. F01N 3/20
60/274
8,402,746 B2 * 3/2013 Powell ..................... B63H 21/32
141/279
(Continued)

FOREIGN PATENT DOCUMENTS

JP 63-319043 A 12/1988
JP 07-128152 A 5/1995
(Continued)

OTHER PUBLICATIONS

International Search Report dated Oct. 25, 2016 for the PCT International Application No. PCT/JP2016/073290.

*Primary Examiner* — Binh Q Tran
(74) *Attorney, Agent, or Firm* — Volpe and Koenig, P.C.

(57) ABSTRACT

Provided is an exhaust-gas treatment equipment including: a reaction container filled with a gas capture material that captures a particular gas component, the reactor container emitting gas obtained by removing the particular gas component from supplied gas by reaction of the supplied gas with the gas capture material; a temperature measuring element disposed in the reaction container, the temperature measuring element measuring a temperature of the gas capture material in the reaction container; a moving unit that freely moves the temperature measuring element in a direction that is parallel to a flow of the supplied gas flowing in the reaction container; and a control unit that estimates a deterioration state of the gas capture material using temperatures of the gas capture material at a plurality of different positions in the reaction container, the temperatures being measured by the temperature measuring element.

19 Claims, 7 Drawing Sheets

(51) Int. Cl.
- *B01J 20/06* (2006.01)
- *B01J 20/20* (2006.01)
- *B01J 20/22* (2006.01)
- *B01J 20/28* (2006.01)
- *B01D 53/04* (2006.01)
- *B01J 20/34* (2006.01)
- *B01D 53/82* (2006.01)
- *F01N 3/08* (2006.01)
- *F01N 3/20* (2006.01)

(52) U.S. Cl.
CPC ........... *F01N 3/20* (2013.01); *B01D 2253/102* (2013.01); *B01D 2253/112* (2013.01); *B01D 2257/504* (2013.01); *Y02A 50/2342* (2018.01); *Y02C 10/04* (2013.01); *Y02C 10/08* (2013.01)

(56) References Cited

U.S. PATENT DOCUMENTS

| | | | |
|---|---|---|---|
| 8,741,028 B2 * | 6/2014 | Muraoka | B01D 53/1412 95/14 |
| 9,155,990 B2 * | 10/2015 | Graff | B01D 53/1406 |
| 9,901,871 B2 * | 2/2018 | Higashi | B01D 53/1425 |
| 2002/0053203 A1 | 5/2002 | Sato et al. | |
| 2003/0206848 A1 | 11/2003 | McLaughlin | |
| 2009/0163748 A1 | 6/2009 | Bank et al. | |
| 2009/0188240 A1 | 7/2009 | Suzuki et al. | |
| 2010/0293921 A1 | 11/2010 | Yamato et al. | |
| 2013/0298532 A1 | 11/2013 | Hamad et al. | |
| 2015/0033711 A1 * | 2/2015 | Hyde | F01N 3/0857 60/281 |

FOREIGN PATENT DOCUMENTS

| | | |
|---|---|---|
| JP | 8-117541 A | 5/1996 |
| JP | 2002-147224 A | 5/2002 |
| JP | 2002-260700 A | 9/2002 |
| JP | 2007-332881 A | 12/2007 |
| JP | 2008-279343 A | 11/2008 |
| JP | 2012-144393 A | 8/2012 |
| JP | 2014-509360 A | 4/2014 |
| JP | 2015-169131 A | 9/2015 |

* cited by examiner

FIG. 5A BEFORE MOVEMENT
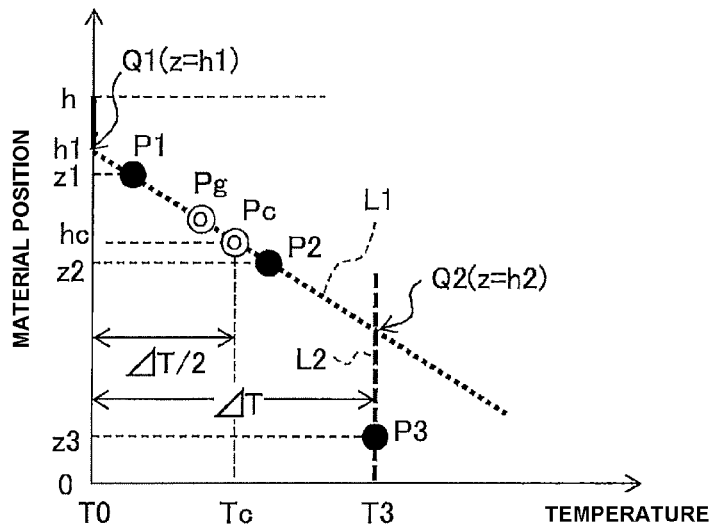
FIG. 5B AFTER MOVEMENT
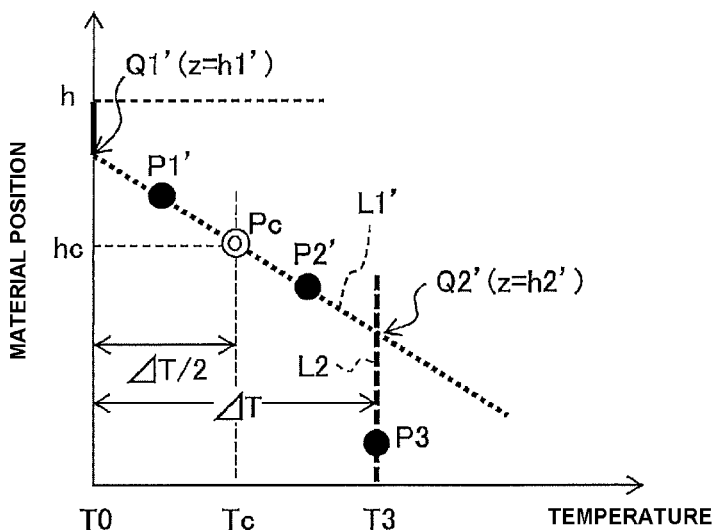

EXHAUST-GAS TREATMENT EQUIPMENT AND GAS-CAPTURE-MATERIAL DETERIORATION-STATE ESTIMATING METHOD

TECHNICAL FIELD

The present invention relates to exhaust-gas treatment equipment that processes exhaust gas emitted from various plants and power-driven machinery, and a gas-capture-material deterioration-state estimating method implemented in the exhaust-gas treatment equipment.

BACKGROUND ART

The exhaust-gas processing technique that uses a solid material such as a capture material or a catalyst to capture specific gas from exhaust gas, desorbs and separates the captured gas, and neutralize the separated gas has been applied to a lot of fields including power plants, synthetic plants, and automobiles, and systemized. However, in most cases, since the exhaust gas emitted from the plants and so on contains components that deteriorate the capture material or catalyst, the capture material or catalyst deteriorates with time. Therefore, to detect the deterioration level of the capture material or catalyst and efficiently manage the system is important in improving the operation and reducing running costs in exhaust-gas processing equipment.

For example, in the exhaust-gas treatment equipment that uses a carbon dioxide (hereinafter referred to as $CO_2$) capture material to recover $CO_2$ from a boiler exhaust gas of a thermal power plant, the boiler exhaust gas contains components that deteriorate the $CO_2$ capture material, such as $SO_x$, $NO_x$, and smoke and dusts. Accordingly, if the $CO_2$ capture receives such components incoming, the $CO_2$ capture material deteriorates in $CO_2$ capture performance with time. After capturing $CO_2$, the $CO_2$ capture material is caused to desorb the captured $CO_2$ by heating or depressurization, and is continuously reused for capture of $CO_2$. The $CO_2$ capture performance of the $CO_2$ capture material can be also lowered due to thermal and pressure hysteresis caused by repeated cycles of capture and desorption.

Generally, the $CO_2$ capture material generates heat at capture of the $CO_2$. Thus, when the $CO_2$ capture performance lowers, the amount of captured $CO_2$ decreases, in turn, the amount of generated heat decreases. Accordingly, by measuring the temperature of the $CO_2$ capture material in the flow of the exhaust gas containing $CO_2$, the deterioration state of the $CO_2$ capture material can be indirectly recognized. For example, Patent literature 1 discloses the technique of estimating the deterioration state of a catalyst according to position in a reaction container by installing a plurality of temperature measuring elements along the flow of gas in the reaction container filled with the catalyst, and monitoring temperatures of the catalyst using the installed temperature measuring elements.

CITATION LIST

Patent Literature

Patent Literature 1: JP 2002-260700 A

SUMMARY OF INVENTION

Technical Problem

According to the technique disclosed in Patent literature 1, the deterioration state of the catalyst can be reliably estimated according to the position in the reaction container. However, to accurately estimate the deterioration state of the catalyst according to the position in the reaction container, as illustrated in FIG. 1, it is required to install a lot of temperature measuring elements in the reaction container. That is, the conventional technique has a problem that to accurately estimate the deterioration state of the capture material and the catalyst in the reaction container, a lot of temperature measuring elements are needed.

Thus, an object of the present invention is to provide a gas treatment equipment and a gas-capture-material deterioration-state estimating method that can estimate a deterioration state of a gas capture material based on temperatures measured by a few temperature measuring elements.

Solution to Problem

Exhaust-gas treatment equipment according to the present invention includes: a reaction container filled with a gas capture material that captures a particular gas component, the reactor container emitting gas obtained by removing the particular gas component from supplied gas by reaction of the supplied gas with the gas capture material; a temperature measuring element disposed in the reaction container, the temperature measuring element measuring a temperature of the gas capture material in the reaction container; a moving unit that freely moves the temperature measuring element in a direction that is parallel to a flow of the supplied gas flowing in the reaction container; and a control unit that estimates a deterioration state of the gas capture material using temperatures of the gas capture material at a plurality of different positions in the reaction container, the temperatures being measured by the temperature measuring element when the temperature measuring element is moved by means of the moving unit.

Advantageous Effects of Invention

The present invention provides gas treatment equipment and a gas-capture-material deterioration-state estimating method that can estimate a deterioration state of a gas capture material based on temperatures measured by a few temperature measuring elements.

BRIEF DESCRIPTION OF DRAWINGS

FIG. 3A is a graph illustrating relationships between material positions and a maximum possible $CO_2$ capture amount of the $CO_2$ capture material, and FIG. 3B is a graph illustrating relationships between the material positions and a maximum possible heat amount of the $CO_2$ capture material;

FIGS. 5A and 5B are views illustrating an example of a method of determining suitable positions of temperature measuring elements;

FIG. 7A is a schematic perspective view, and FIG. 7B is a schematic bottom view.

DESCRIPTION OF EMBODIMENT

Figure 1:
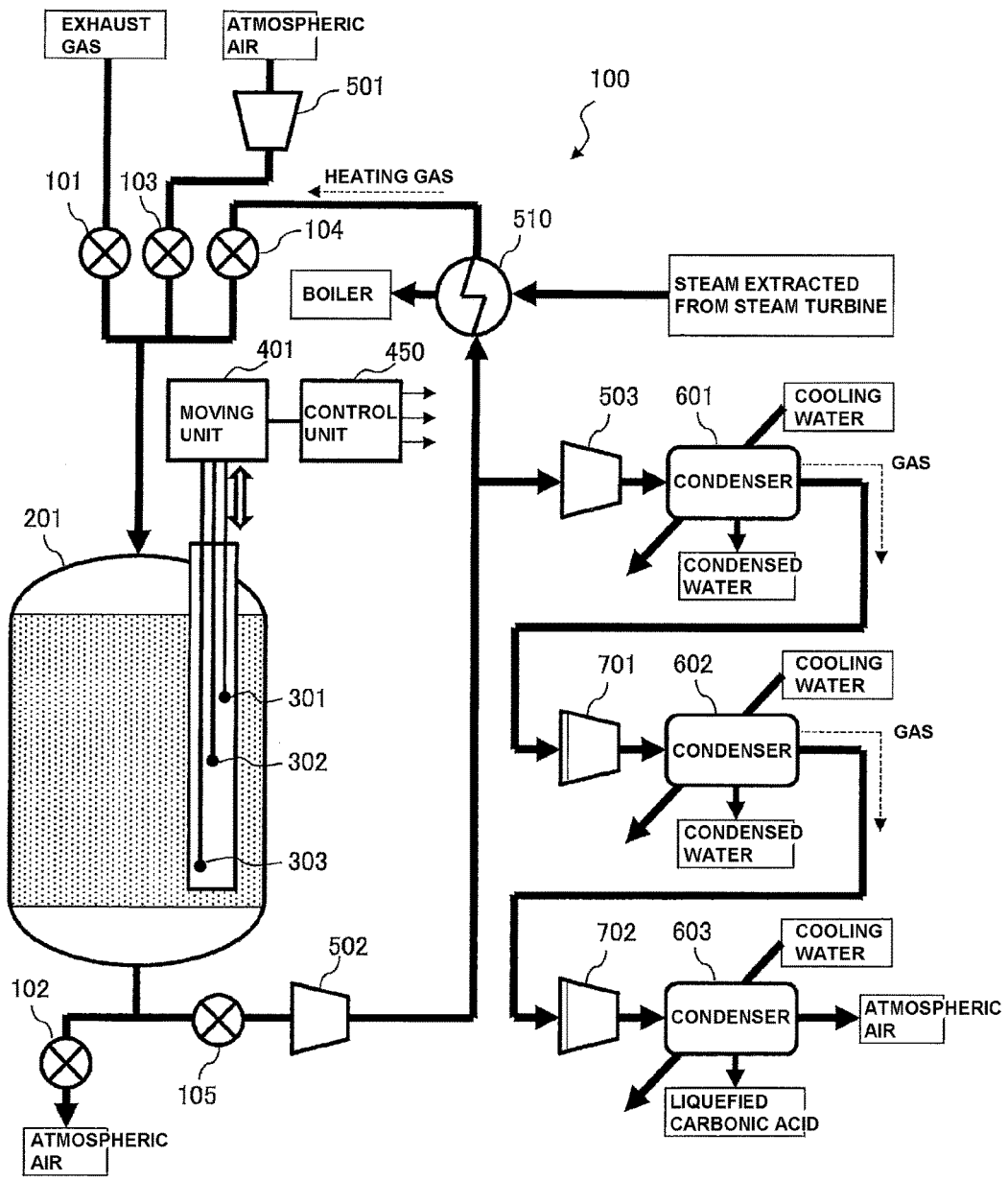
FIG. 1 is a view illustrating an example of the configuration of exhaust-gas treatment equipment in in accordance with an embodiment of the present invention.

An embodiment of the present invention will be described below in detail with reference to accompanying figures. Common constituents are given the same reference numerals and description thereof is omitted.

<Configuration of Exhaust-Gas Treatment Equipment and Recovery Step of $CO_2$>

FIG. 1 illustrates an example of the configuration of exhaust-gas treatment equipment 100 according to an embodiment of the present invention. As illustrated in FIG. 1, the exhaust-gas treatment equipment 100 includes a $CO_2$ capture container (reaction container) 201, a heat exchanger 510, ventilators 501, 502, and 503, condensers 601, 602, and 603, and compressors 701, and 702, and the like. In FIG. 1, thick lines with arrows represent flow paths for gas and so on, which are formed of pipes connecting the above-mentioned constituents to each other, and valves 101, 102, 103, 104, and 105 are appropriately provided in the middle of the flow paths.

For example, the exhaust-gas treatment equipment 100 illustrated in FIG. 1 recovers $CO_2$ from exhaust gas from a boiler of a power plant, and refines liquefied carbonic acid. Accordingly, a main constituent of the exhaust-gas treatment equipment 100 is a $CO_2$ capture container 201 filled with the $CO_2$ capture material containing cerium oxide ($CeO_2$). The $CO_2$ recovery step includes three steps of capture, heating, and cooling.

That is, in the capturing step, the exhaust gas from the boiler is circulated in the $CO_2$ capture container 201, and $CO_2$ contained in the exhaust gas is captured by the $CO_2$ capture material filled in the $CO_2$ capture container 201. Next, in the heating step, heating gas is circulated in the $CO_2$ capture material that captures $CO_2$, thereby desorbing $CO_2$ from the $CO_2$ capture material to increase the $CO_2$ concentration of the gas emitted from the $CO_2$ capture container 201. Then, gas having a high $CO_2$ concentration is extracted to further condense $CO_2$ by the condensers 601, 602, and 603, refining liquefied carbonic acid. In the cooling step, air of room temperatures is circulated in the $CO_2$ capture container 201 to cool the $CO_2$ capture material in the $CO_2$ capture container 201.

In this embodiment, temperature measuring elements 301, 302, and 303 formed of thermocouples or the like are disposed in the $CO_2$ capture container 201, and a moving unit 401 for vertically moving the temperature measuring elements 301, 302, and 303 is disposed outside the temperature measuring elements. The moving unit 401 is connected to a control unit 450 constituted of a generally-used computer or the like. The control unit 450 moves the temperature measuring elements 301, 302, and 303 to respective predetermined positions through the moving unit 401, which acquires temperatures of the $CO_2$ capture material, which are measured by the temperature measuring elements 301, 302, and 303. Further, the control unit 450 estimates the deterioration state of the $CO_2$ capture material in the $CO_2$ capture container 201 based on the acquired temperatures. Details thereof will be described with reference to other figures.

First, each constituent of the exhaust-gas treatment equipment 100 will be described in detail, and each of the capture, heating, and then, cooling steps for $CO_2$ recovery using the $CO_2$ capture container 201 will be described.

As illustrated in FIG. 1, the exhaust-gas treatment equipment 100 includes three flow paths through which exhaust gas from the boiler, atmospheric air, and heating gas are allowed to flow, respectively, as inlet flow paths into the $CO_2$ capture container 201 that is the reaction container. These three flow paths are provided with the valves 101, 103, and 104, respectively. One of the valves is opened and the other valves are closed in each of the capture, heating, and cooling steps. The exhaust-gas treatment equipment 100 also includes a flow path leading from the $CO_2$ capture container 201 to the atmospheric air or the heat exchanger 510 via the valves 102 and 105. One of the valves 102 and 105 is opened and the other is closed in each of the capture, heating, and cooling steps.

First, in the capturing step, the valves 101 and 102 are opened, and the valves 103, 104, and 105 are closed, thereby causing the exhaust gas to flow from the boiler in the $CO_2$ capture container 201, and capturing $CO_2$ in the exhaust gas by use of the $CO_2$ capture material filled in the $CO_2$ capture container 201. At this time, the $CO_2$ capture material captures $H_2O$ as well.

Here, it is given that the temperature of the exhaust gas from the boiler is 50° C., and the composition is $N_2$: 70 vol %, $CO_2$: 13 vol %, $H_2O$: 12 vol %, $O_2$: 5 vol %, $SO_x$: 1 ppm, and $NO_x$: 10 ppm.

Next, in the heating step, the valves 104 and 105 are opened, the valves 101, 102, and 103 are closed, and the ventilator 502 is operated. At this time, gas emitted from the $CO_2$ capture container 201 is sent from the heated heat exchanger 510, and is heated by the heat exchanger 510. The gas heated by the heat exchanger 510 as the heating gas is circulated in the $CO_2$ capture container 201. It is assumed that vapor of about 200° C. extracted from a vapor turbine is supplied to the heat exchanger 510, and the temperature of the heating gas heated by the heat exchanger 510 is 160° C.

Here, the $CO_2$ capture material in the $CO_2$ capture container 201 contacts the heating gas to be heated to about 150° C. Then, the captured $CO_2$ and $H_2O$ are gradually desorbed. Accordingly, in the heating step, the ventilator 502 is operated, allowing the gas containing $CO_2$ and $H_2O$ desorbed from the $CO_2$ capture material to be heated through the heat exchanger 510 and circulate in the $CO_2$ capture container 201, and further desorbing $CO_2$ and $H_2O$, to form a cyclic process.

When the $CO_2$ concentrations of $CO_2$ and $H_2O$ in the gas flowing out of the $CO_2$ capture container 201 increase as a result of repetition of the above-mentioned cyclic process, the ventilator 503 is operated to extract a portion of the heated gas and sent the extracted portion to the condenser 601. At this time, since the condenser 601 is cooled with cooling water of, for example, 25° C. (room temperatures), $H_2O$ in the gas condenses. As a result, the gas with reduced $H_2O$ concentration and condensed water are separated and emitted from the condenser 601.

The gas emitted from the condenser 601 (gas emitted from the condenser 601 into the flow path as represented by a broken arrow in FIG. 1) contains $H_2O$ of about saturated vapor pressure. To remove the $H_2O$, the compressors 701 compresses the gas and then, the condenser 602 condenses H₂O again. At this time, like the condenser 601, the condenser 602 is cooled with cooling water of room temperatures. Accordingly, the gas with further reduced $H_2O$ concentration and condensed water are separated and emitted from the condenser 602.

The reason why the gas to be taken into the condenser 602 is compressed by the compressors 701 is that the ratio total pressure: saturated vapor pressure is high in high-pressure gas such that the purity of CO can be readily increased. However, when the partial pressure of CO exceeds 7.4 MPa, $CO_2$ becomes liquefied carbonic acid or supercritical $CO_2$, which is not suitable for separation from $H_2O$. Accordingly, in the compressors 701, the partial pressure of $CO_2$ is preferably controlled to be equal to or smaller than 7.4 MPa.

The gas emitted from the condenser 602 (gas emitted from the condenser 601 into the flow path as represented by a broken arrow in FIG. 1) is compressed by the compressors 702 and then, is sent to the condenser 603 and is cooled with cooling water. At this time, $CO_2$ in the gas condenses and becomes liquefied carbonic acid. Remaining gas is discharged into atmospheric air.

In compression in the compressors 702, when the partial pressure of $N_2$ is equal or greater than 3.4 MPa, $N_2$ contained in the gas becomes liquid $N_2$ or supercritical $N_2$, which is not suitable for separation from $CO_2$. To extract $CO_2$ as liquefied carbonic acid using cooling water of 25° C., $N_2$ is preferably compressed by the compressors 702 such that the partial pressure of $N_2$ becomes equal or greater than 7.4 MPa or more. Accordingly, to set the partial pressure of $CO_2$ to 7.4 MPa or more and the partial pressure of $N_2$ to 3.4 MPa or less, the ratio of $CO_2:N_2$ in the recovered gas (gas emitted from the condenser 602) is preferably, 7.4 MPa/3.4 MPa=68/32 or more. That is, the $CO_2$ concentration in the recovered gas without consideration of the $O_2$ concentration is preferably, 68% or more, more preferably, 80% or more. When the temperature of the recovered gas is lower than 25° C., the pressure may be lower than the above-mentioned pressure. However, in this case, a cooler is required, increasing power consumption of the equipment.

In the cooling step, the valve 102 and the valve 103 are opened, the valves 101, 104, and 105 are closed, and the ventilator 501 is operated. That is, in the cooling step, by circulating atmospheric air in the $CO_2$ capture container 201, the temperature of the $CO_2$ capture material is lowered to about 50° C. In that case, to prevent moisture in the gas from condensing in the capturing step, cooling is stopped at a temperature that is higher than the dew point of the exhaust gas flowing in the $CO_2$ capture container 201.

To smoothly execute each of the above-mentioned capturing, heating, and cooling steps, opening/closing of the valves 101 to 105, and operation of the ventilators 501 to 503, the heat exchanger 510, the condensers 601 to 603, and the compressors 701, 702 are controlled by a computer. Here, a computer constituting the control unit 450 is used. In FIG. 1, small arrows from the block of the control unit 450 represent signals for controlling the above-mentioned processes. The computer that controls the processes may be a computer other than the control unit 450.

<$CO_2$ Capture Material Deterioration Model>

In the exhaust-gas treatment equipment 100, a cycle including the three processes of capture, heating, and cooling for $CO_2$ recovery is repeated, such that poisoning gas such as $SO_x$ and $NO_x$ as well as smoke and dusts adsorb on or combine with the $CO_2$ capture material in the exhaust-gas treatment equipment 100. For this reason, the $CO_2$ capture performance of the $CO_2$ capture material gradually deteriorates. In other words, the maximum possible amount of $CO_2$ that can be captured by the $CO_2$ capture material, that is, the maximum possible $CO_2$ capture amount gradually decreases.

FIGS. 2A to 2F are views illustrating the deterioration state of the $CO_2$ capture material in the $CO_2$ capture container 201 on a time-series basis. In each of graphs of FIGS. 2A to 2F, a vertical axis represents the material position at which the $CO_2$ capture material is disposed, and the horizontal axis represents the maximum possible $CO_2$ capture amount of the $CO_2$ capture material disposed at the material position. In FIGS. 2A to 2F, the deterioration of the $CO_2$ capture material progresses in the order of (a), (b), (c), (d), (e), and (f).

Here, the exhaust gas containing $CO_2$ enters from the top of the $CO_2$ capture container 201, and $CO_2$ contained in the gas is captured by the $CO_2$ capture material. Then, the gas without $CO_2$ is emitted from the bottom of the $CO_2$ capture container 201 (see FIG. 1). Accordingly, the material positions in the graphs of FIGS. 2A to 2F represent the positions of the $CO_2$ capture material in the direction that is parallel to the flow of the exhaust gas containing $CO_2$ flowing in the $CO_2$ capture container 201, which means the height of the filled $CO_2$ capture material from the bottom of the container. That is, the material position=0 represents the lowest position of the $CO_2$ capture material, and the material position=h represents the highest position of the $CO_2$ capture material.

Figure 2A:
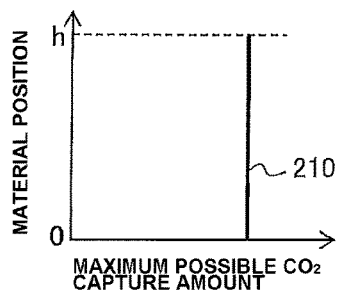
FIGS. 2A to 2F are views illustrating the deterioration state of a $CO_2$ capture material in a $CO_2$ capture container in a time series basis.
Figure 2B:
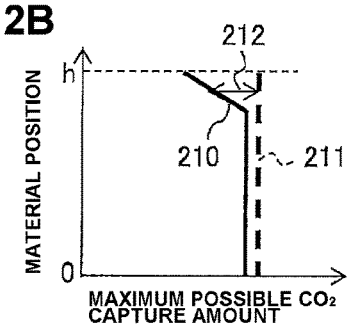

First, in the state where a new $CO_2$ capture material is just filled in the $CO_2$ capture container 201 (initial state), as expressed by a thick solid line 210 in FIG. 2A, the maximum possible $CO_2$ capture amount of the $CO_2$ capture material is uniform at any material position. The maximum possible $CO_2$ capture amount in this state is referred to as an initial maximum possible $CO_2$ capture amount, and in figures subsequent to FIG. 2B, is expressed by thick broken line 211.

When the three processes of capture, heating, and cooling are repeated plural times, the exhaust gas flows from the top. Thus, the $CO_2$ capture material disposed at the highest position starts to deteriorate (see FIG. 2B). In this case, the $CO_2$ capture material located closer to the top directly receives exhaust gas containing more smoke and dusts, and deteriorates more rapidly. Accordingly, as expressed by an inclined segment of the thick solid line 210, the maximum possible $CO_2$ capture amount becomes smaller as the material position is higher, and becomes larger as the material position is lower. That is, the position of the $CO_2$ capture container 201 is lower, the deterioration level of the $CO_2$ capture material decreases.

However, typically, the maximum possible $CO_2$ capture amount does not recover to the initial maximum possible $CO_2$ capture amount (thick broken line 211) (vertical linear segment of the thick solid line 210). This may be due that each time the processes are repeated, the $CO_2$ capture material in the $CO_2$ capture container 201 deteriorates gradually but wholly. In the figures subsequent to FIG. 2B, a deterioration amount of the maximum possible $CO_2$ capture amount is represented as a difference 212 between the thick broken line 211 indicating the initial maximum possible $CO_2$ capture amount and the thick solid line 210 indicating the maximum possible $CO_2$ capture amount.

Figure 2C:
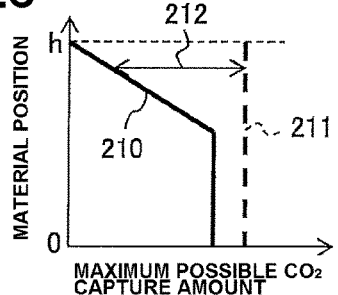
Figure 2D:
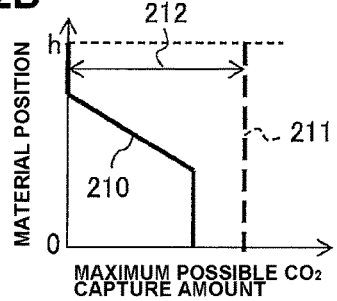

Next, when the processes are further repeated, the deterioration of the $CO_2$ capture material gradually progresses from the top toward the bottom (see FIG. 2C) and first, the $CO_2$ capture material located at the upper position has approximately 0 maximum possible $CO_2$ capture amount, losing its $CO_2$ capture performance (see FIG. 2D). When the processes are further repeated, the $CO_2$ capture material located at the lower position starts to deteriorate (see FIG. 2E), and finally, $CO_2$ capture material disposed near the bottom of the $CO_2$ capture container 201 has almost 0 maximum possible $CO_2$ capture amount (see FIG. 2F).

Figure 3A:
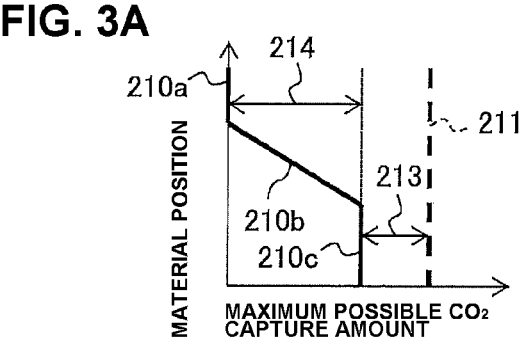
FIGS. 3A and 3B are views schematically illustrating a deterioration model of the $CO_2$ capture material in the $CO_2$ capture container.
Figure 3B:
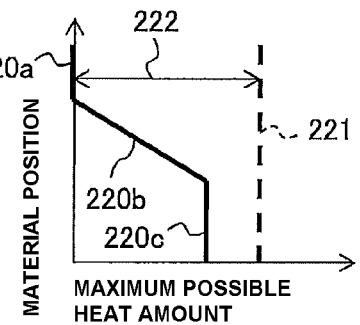

FIGS. 3A and 3B are schematically illustrating a deterioration model of the $CO_2$ capture material in the $CO_2$ capture container 201, FIG. 3A is a graph illustrating relationships between the material positions and the maximum possible $CO_2$ capture amount of the $CO_2$ capture material, and FIG. 3B is a graph illustrating relationships between the material positions and a maximum possible heat amount of the $CO_2$ capture material. The maximum possible heat amount refers to the amount of heat generated when the $CO_2$ capture material captures all $CO_2$ of the maximum possible $CO_2$ capture amount at the material position.

In this embodiment, as illustrated in FIG. 3A, the model of the deterioration state of the maximum. possible $CO_2$ capture amount of the $CO_2$ capture material in the $CO_2$ capture container 201 is constituted of:

(1) a thick solid line 210a in which the maximum possible $CO_2$ capture amount is approximately 0 at the upper material position;

(2) a thick solid line 210b in which the maximum possible $CO_2$ capture amount linearly decreases with respect to a change in the material position at the middle material position; and (3) a thick solid line 210c in which the maximum possible $CO_2$ capture amount becomes almost constant and does not change at the lower material position.

Figure 2E:
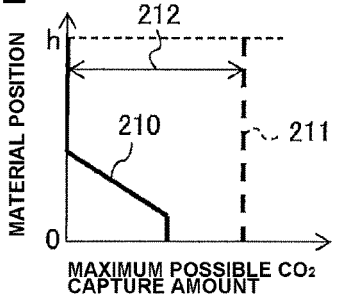

The deterioration model illustrated in FIG. 3A can be associated with FIGS. 2D to 2E. In FIG. 3A, the case where the thick solid line 210a having almost 0 maximum possible $CO_2$ capture amount is not present can be associated with FIGS. 2B and 2C, and the case where the thick solid line 210c is not present can be associated with FIG. 2F.

A deterioration amount 213 of the maximum possible $CO_2$ capture amount, which is acquired by subtracting the thick solid line 210c from the thick broken line 211 (the initial maximum possible $CO_2$ capture amount) in FIG. 3A is referred to as an overall deterioration amount. That is, the overall deterioration amount is a deterioration amount by which the $CO_2$ capture material in the $CO_2$ capture container 201 deteriorates almost uniformly when the capture, heating, and cooling steps are repeated. A deterioration amount 214 of the maximum possible $CO_2$ capture amount, which is acquired by subtracting the thick solid line 210a or the thick solid line 210b from the thick solid line 210c, is referred to as a local deterioration amount. That is, the local deterioration amount is a deterioration amount by which the $CO_2$ capture material deteriorates depending on the material position when the heating and cooling steps are repeated.

The maximum possible heat amount of the $CO_2$ capture material is substantially proportional to the maximum possible $CO_2$ capture amount of the $CO_2$ capture material. In this case, the relationships between the material positions and the maximum possible $CO_2$ capture amount as represented by the thick solid lines 210a, 210b, and 210c in FIG. 3A can be replaced with relationships between the material positions and the maximum possible heat amount as represented by thick solid lines 220a, 220b, and 220c in FIG. 3B.

Here, a thick broken line 221 in FIG. 3B represents an initial maximum possible heat amount (maximum possible heat amount before deterioration) of the $CO_2$ capture material. Accordingly, a decrease 222 of the maximum possible heat amount due to the deterioration of the $CO_2$ capture material corresponds to a difference between the thick broken line 221 and the thick solid lines 220a, 220b, and 220c. That is, the relationships between the material positions and the maximum possible heat amount as represented by the thick solid lines 220a, 220b, and 220c in FIG. 3B can be also said to represent the deterioration model of the $CO_2$ capture material.

<$CO_2$ Capture Material Deterioration-State Estimating Method>

Figure 4A:
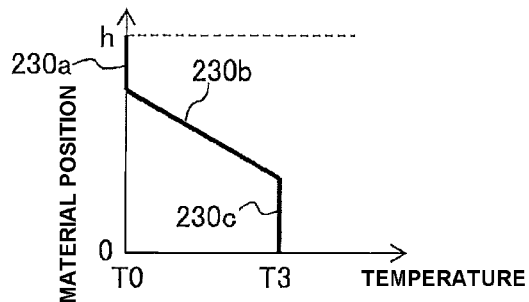
FIGS. 4A to 4C are views illustrating a deterioration state of the $CO_2$ capture material based on temperatures in the $CO_2$ capture container in a capturing step.
Figure 4B:
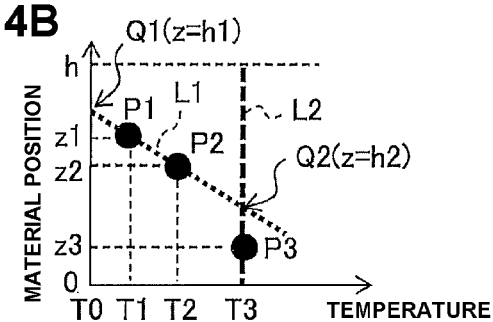
Figure 4C:
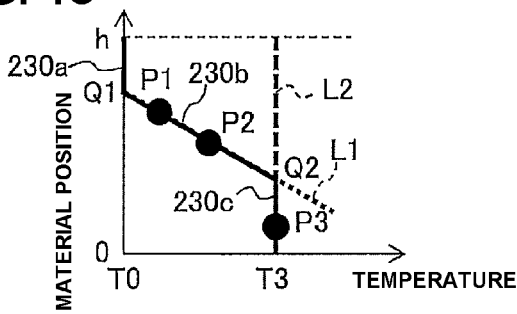

FIGS. 4A to 4C are views illustrating a basic concept of estimating the deterioration state of the $CO_2$ capture material based on temperatures in the $CO_2$ capture container 201 in the capturing step. Here, the deterioration state of the $CO_2$ capture material is estimated based on the temperatures measured by the temperature measuring elements 301, 302, and 303 disposed at three different material positions in the $CO_2$ capture container 201 (see FIG. 1). At this time, deterioration state of the $CO_2$ capture material follows the deterioration model illustrated in FIG. 3A.

Here, heat generation of the $CO_2$ capture material in the capturing step is considered. First, since $CO_2$ is not captured in the material position segment in which the maximum possible $CO_2$ capture amount is 0 (the material position segment represented by the thick solid line 210a in FIG. 3A), the heat amount of the $CO_2$ capture material becomes 0. Since $CO_2$ to be captured from the flowing exhaust gas is not left in the material position segment in which the maximum possible $CO_2$ capture amount is constant (the material position segment represented by the thick solid line 210c in FIG. 3A), the heat amount of the $CO_2$ capture material can be considered to be approximately 0. On the contrary, the maximum possible $CO_2$ capture amount increases in the flowing direction of the exhaust gas (downward) in the material position segment represented by the thick solid line 210b in FIG. 3A. This means that $CO_2$ is captured to generate heat in this region.

In the capturing step, when exhaust gas of temperature T0 (for example, 50° C.) is supplied to the $CO_2$ capture container 201, the $CO_2$ capture material does not generate heat in the material position segment represented by the thick solid line 210a in FIG. 3A and thus, the temperature of the flowing exhaust gas does not rise. Thus, at any position of the material position segment, as illustrated in FIG. 4A, the temperature of the flowing exhaust gas does not change from the temperature T0 (for example, 50° C.).

Next, when the exhaust gas passes through the material position segment in which the $CO_2$ capture material generates heat (the material position segment represented by the thick solid line 210b in FIG. 3A), the temperature of the exhaust gas rises due to heat generation of the $CO_2$ capture material. Moreover, since the exhaust gas moves downward, the temperature of the exhaust gas rises toward the bottom. Accordingly, in the material position segment, as represented by a thick solid line 230b in FIG. 4A, the temperature of the exhaust gas gradually rises from the temperature T0 to a temperature T3 (wherein, T1>T0). Although not required, for simplicity, it is assumed that there is a linear relationship between the material position and the temperature rise.

Next, when the exhaust gas passes through the material position segment in which the $CO_2$ capture material does not generate heat (the material position segment represented by the thick solid line 210c in FIG. 3A), the temperature of the exhaust gas does not rise and thus, remains to be the temperature T3 as represented by a thick solid line 230c in FIG. 4A.

Thus obtained graph represented by the thick solid lines 230a, 230b, and 230c in FIG. 4A indicates temperature distribution of the CO$_2$ capture material along the flowing direction of the exhaust gas in the CO$_2$ capture container 201.

Subsequently, the temperature measuring elements 301 and 302 are disposed at material positions z1 and z2 included in the thick solid line 230b in FIG. 4A, and temperatures measured at the material positions z1 and z2 are defined as T1 and T2, respectively. Similarly, the temperature measuring element 303 is disposed at a material position z3 included in the thick solid line 230c in FIG. 4A, and the temperature measured at the material position z3 is defined as T3.

Next, the above-mentioned measurement data is plotted in a graph having temperature (T) as a horizontal axis and material position (z) as a vertical axis, and plotted points are defined as P1, P2, and P3. Then, a straight line L1 passing the points P1 and P2 is found, and a straight line L2 that passes the point P3 and is constant in temperature is found. Further, points at which the straight line L1 crosses a straight line having T=T0 and a straight line (straight line L2) having T=T3 are defined as Q1, Q2, respectively, and their material positions are defined as h1, h2, respectively.

In the case where h1 is equal to or larger than h (h: the highest position), the deterioration state of the CO$_2$ capture material is still an initial state, and corresponds to the deterioration state illustrated in FIG. 2B or 2(c). Accordingly, in this case, there is no segment of the thick solid line 230a, in which the temperature does not change from the temperature of the supplied exhaust gas. In the case of h>h1 and h2>0, the deterioration of the CO$_2$ capture material progresses, but the available CO$_2$ capture material is left. This deterioration state corresponds to the deterioration state illustrated in FIG. 2D to 2E. In the case where h2 is equal to or smaller than 0, the CO$_2$ capture material almost deteriorates, and the deterioration state corresponds to the deterioration state illustrated in FIG. 2F.

In this manner, the thick solid lines 230a, 230b, and 230c representing the relationships between the material positions and the temperatures in the CO$_2$ capture container 201 as illustrated in FIG. 4C can be acquired. These thick solid lines 230a, 230b, and 230c can be associated with the thick solid lines 210a, 210b, and 210c representing the relationships between the material positions and the maximum possible CO$_2$ capture amount in FIG. 3A, respectively. Accordingly, the deterioration state of the CO$_2$ capture material in the CO$_2$ capture container 201 can be estimated based on the shape of the thick solid lines 230a, 230b, and 230c in FIG. 4C, or the values h1 and h2 of the material positions of points Q1 and Q2 in FIG. 4C.

In this embodiment, the material positions at the temperature measuring elements 301, 302, and 303 are disposed can be vertically moved by a moving unit 402. Accordingly, the temperature measuring element 303 for determining the straight line L2 may be at the material position close to the bottom of the CO$_2$ capture container 201, that is, the material position that is slightly higher than 0. At least initially, the temperature measuring element 301 for determining the straight line L1 may be disposed at the material position close to the top of the CO$_2$ capture container 201, that is, the material position that is slightly lower than h. Then, the temperature measuring element may be moved appropriately depending on the progress of the deterioration of the CO$_2$ capture material. In cooperation with the temperature measuring element 301, the temperature measuring element 302 may be disposed at the material position that is lower than the material position of the temperature measuring element 301 by a predetermined distance.

FIGS. 5A and 5B are views illustrating an example of a method of determining suitable positions of the temperature measuring elements 301 and 302. Here, first, in the capturing step, the temperature measuring elements 301, 302, and 303 are disposed at the material positions z1, z2, and z3, respectively, and measure the temperatures T1, T2, and T3. Next, as illustrated in FIGS. 4A to 4C, measurement data is plotted in a graph having material position as a vertical axis and temperature as a horizontal axis to acquire points P1, P2, and P3. Subsequently, a straight line passing the points P1 and P2 is defined as L1, and a straight line that passes the point P3 and is constant in temperature (T=T3) is defined as L2. Further, points at which the straight line L1 crosses the straight line having T=T0 and the straight line having T=T3 (straight line L2) are defined as Q1, Q2, respectively, and their material positions are defined as h1, h2.

At this time, the points P1 and P2 may be disposed at any position on the straight line L1. That is, the points P1 and P2 may be biased toward the point Q1, or toward the point Q2. However, when the points P1 and P2 are biased, suitable inclination of the straight line L1 may not be achieved. Here, the points P1 and P2, that is, the temperature measuring elements 301 and 302 are moved such that a center Pg between the points P1 and P2 is located at a center Pc of a line segment P1-P2.

For this reason, first, a difference ΔT (=T3−T0) between the temperature T3 measured by the temperature measuring element 301 and the temperature T0 of the exhaust gas supplied to the CO$_2$ capture container 201 is found. Next, a temperature Tc (=T0+ΔT/2) at a center Pc between a line segment Q1-Q2, and a material position hc (=(h1+h2)/2) are found based on the straight line L1, and a point expressed by the temperature Tc and the material position hc is defined as Pc. Then, material positions z1' and z2', to which the temperature measuring elements 301 and 302 are to be moved, are calculated according to following equations (see FIG. 5B).

$$z1'=hc+(z1-z2)/2 \quad (1)$$

$$z2'=hc-(z1-z2)/2 \quad (2)$$

Subsequently, the temperature measuring elements 301 and 302 are moved to the material positions z1' and z2', and temperatures T1' and T2' measured at the material positions are acquired. The, as illustrated in FIG. 5B, data on the temperatures T1' and T2' at the material positions z1' and z2' is plotted in a graph having material position as a vertical axis and temperature as a horizontal axis, and the points are defined as P1' and P2'. Next, a new straight line L1' passing the points P1' and P2' is found, and material positions h1' and h2' of points Q1' and Q2' at which the straight line L1' crosses a straight line having T=T0 and a straight line having T=T3 (straight line L2) are found.

In this case, the temperature measuring element 303 is not moved and however, may be appropriately moved at the material position of z<h2. Even when moved, the temperature measuring element 303 basically measures the same temperature T3.

Thus acquired inclination of the straight line L1' and the material positions h1' and h2' of the points Q1' and Q2' can be regarded as more suitable values than the inclination of the straight line L1 and the material positions h1 and h2 of the points Q1 and Q2, which are acquired before movement of the temperature measuring elements 301 and 302. That is, since the temperature measuring elements 301 and 302 are disposed substantially at the center of the material position segment of the CO$_2$ capture material generating heat due to capture of $CO_2$ (the segment represented by the thick solid line 230b in FIG. 4C), the temperatures measured by the temperature measuring elements and its inclination (change rate of temperature with respect to the material position) are more stabilized.

As apparent from FIGS. 2A to 2F, each time the capture, heating, and cooling steps are repeated, the straight line L1 gradually moves downward, and the straight line L2 gradually moves to left. In other words, the line segment Q1-Q2 (the segment represented by the thick solid line 230b in FIG. 4C) becomes shorter as it moves downward. Accordingly, each time capturing step is performed, the material positions of the temperature measuring elements 301 and 302 are determined to move the temperature measuring elements 301 and 302 according to the above-mentioned method, thereby determining material positions suitable for the temperature measurement, and enabling more accurate estimation of the deterioration state of the $CO_2$ capture material.

<$CO_2$ Capture Material Deterioration-State Estimation Processing>

The control unit 450 illustrated in FIG. 1 includes a computer. The computer executes acquisition and storage of data on temperatures at positions, and predetermined calculations, and further controls execution of the capture, heating, and cooling steps for $CO_2$ recovery. In the capturing step, the processing of acquiring temperatures measured by the temperature measuring elements 301, 302, and 303 is combined with the processing of driving the moving unit 401 to vertically move the temperature measuring elements 301, 302, and 303 to achieve $CO_2$-capture-material deterioration-state estimating processing.

Figure 6:
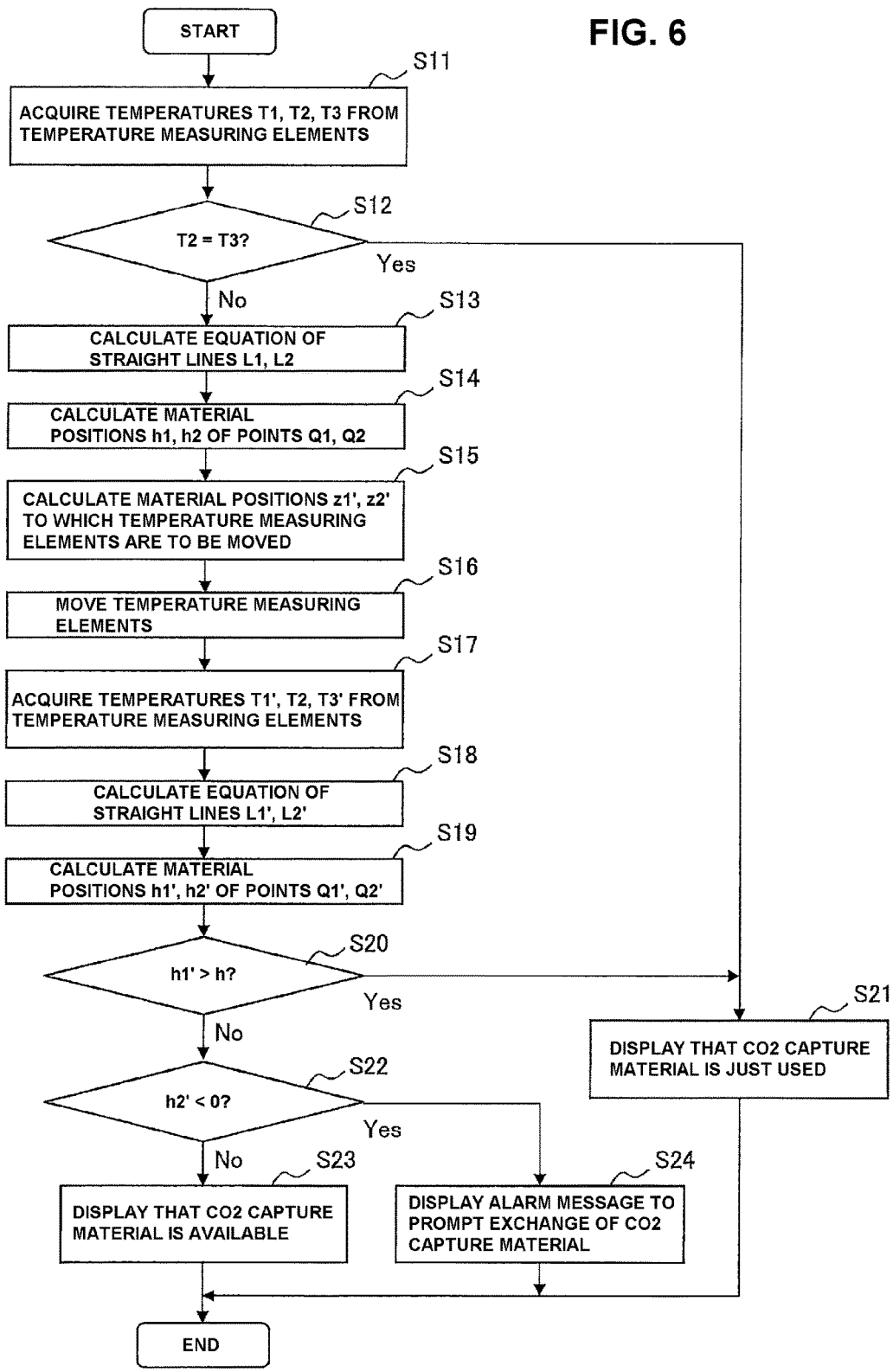
FIG. 6 is a flow chart illustrating a flow of $CO_2$-capture-material deterioration-state estimating processing by use of a computer.

FIG. 6 is a flow chart illustrating a flow of the $CO_2$-capture-material deterioration-state estimating processing by use of the computer. Desirably, each time the capturing step for $CO_2$ recovery is performed, the $CO_2$-capture-material deterioration-state estimating processing is executed at the time close to the end of the capturing step, at which the temperature in the $CO_2$ capture container 201 is stable. Details of the $CO_2$-capture-material deterioration-state estimating processing will be described below with reference to FIGS. 2A to 2F and FIGS. 5A and 5B.

First, before executing the $CO_2$-capture-material deterioration-state estimating processing in FIG. 6, the computer initializes the material positions of the temperature measuring elements 301, 302, and 303 to z1, z2, and z3, respectively. Here, when the initial capturing step is executed, for example, z1=h×0.9, z2=h×0.8, z3=h×0.1 are set as initial values of the material positions z1, z2, and z3. h indicates the highest material position, given that the material position of the $CO_2$ capture material at the bottom of the $CO_2$ capture container 201 is set to 0 (zero) (height: see FIGS. 4A to 4C). When the second or subsequent capturing step is executed, the material positions z1' and z2', and z3' of the temperature measuring elements 301, 302, and 303 after execution of the last capturing step may be used as the initial values of the material positions z1, z2, and z3.

Subsequently, when the capturing step is started and the temperature at each material position in the $CO_2$ capture container 201 becomes stabilized, the computer starts the $CO_2$-capture-material deterioration-state estimating processing illustrated in FIG. 6. The time when the temperature at each material position becomes stabilized may be the time when a predetermined time elapse from the start time of the capturing step. Alternatively, the temperature stabilization may be determined by monitoring the temperatures of the temperature measuring elements 301, 302, and 303.

As illustrated in FIG. 6, the computer acquires temperatures T1, T2, and T3 (measurement data) from the temperature measuring elements 301, 302, and 303 (Step S11), to determine whether T2=T3 or not (Step S12). However, T2=T3 herein means that T2 is equal to T3 with a predetermined error of about 0.5, for example. That is, it is determined whether or not |T2−T3| is equal to or smaller than the predetermined error.

In the case where T2 is equal to T3 as a result of the determination in Step S12 (Yes in Step S12), the deterioration state of the $CO_2$ capture material is as illustrated in FIG. 2B, and in FIG. 5A, the point P1 is located on the straight line L1 and the points P2 and P3 are located on the straight line L2. Thus, for example, the computer displays a message indicating that the $CO_2$ capture material is just used on a display device (Step S21).

On the contrary, in the case where T2 is not equal to T3 as a result of the determination in Step S12 (No in Step S12), in FIGS. 5A and 5B, the points P1 and P2 are located on the straight line L1. Thus, the computer calculates the equation of the straight line L1 passing the points P1 and P2, and the equation of the straight line L2 that passes the point P3 and is constant in temperature (Step S13). Next, the computer calculates material positions h1 and h2 of the points Q1 and Q2 at which the straight line L1 crosses the straight line having T=T0 and the straight line having T=T3 (straight line L2), respectively (Step S14).

Subsequently, the computer calculates the material positions z1' and z2' to which the temperature measuring elements 301 and 302 are to be moved according to the method of moving the temperature measuring elements 301 and 302, which is described with reference to FIGS. 5A and 5B, that is, using the equations (1) and (2) (Step S15). Next, the computer moves the temperature measuring elements 301 and 302 to the calculated material positions via the moving unit 401 (Step S16). Here, the temperature measuring element 303 is assumed to be located close to the bottom of the $CO_2$ capture container 201 (for example, the location of z3=h×0.1), and is not moved.

Subsequently, the computer acquires the temperatures T1', T2', and T3' measured at the moved material positions from the temperature measuring elements 301, 302, and 303 (Step S17). Next, the computer calculates the equation of the straight line L1' passing the points P1' and P2', and the equation of the straight line L2' that passes the point P3' and is constant in temperature (Step S18). Since the temperature measuring element 303 does not change the material position, T3' is equal to T3, and the point P3' and the straight line L2' are the same as the point P3 and the straight line L2, respectively.

Subsequently, the computer calculates the material positions h1' and h2' of the points Q1' and Q2' at which the straight line L1' crosses the straight line having T=T0 and the straight line having T=T3 (straight line L2) (Step S19). Next, the computer determines whether or not the material position h1' of the point Q1' is larger than the highest material position h of the $CO_2$ capture material, that is, h1' is larger than h (Step S20). When h1' is larger than h as a result of the determination (Yes in Step S20), the deterioration state of the $CO_2$ capture material is as illustrated in FIG. 2B or 2(c). Thus, for example, the computer displays a message indicating that the $CO_2$ capture material is just used on a display device (Step S21).

Figure 2F:
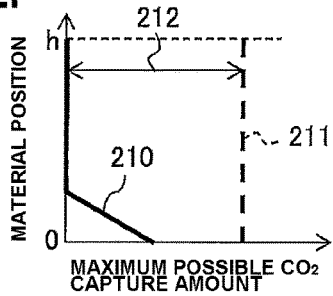

On the contrary, when h1' is not larger than h as a result of the determination in Step S20 (No in Step S20), the computer determines whether or not the material position h2' of the point Q2' is smaller than the material position 0 at the bottom of the $CO_2$ capture material, that is, h2' is smaller than 0 (Step S22). When h2' is smaller than 0 as a result of the determination (Yes in Step S22), the deterioration state of the $CO_2$ capture material is as illustrated in FIG. 2F. Thus, for example, the computer displays an alarm message to prompt an exchange of the $CO_2$ capture material on a display device (Step S24).

When h2' is not smaller than 0 as a result of the determination in Step S22 (No in Step S22), the deterioration state of the $CO_2$ capture material is as illustrated in FIG. 2D or 2E. Thus, for example, the computer displays a message indicating that the $CO_2$ capture material is still available on a display device (Step S23). In Steps S21 to S24, graphs indicating the deterioration state of the $CO_2$ capture material, such as FIGS. 2A to 2F, may be displayed along with the messages.

The above-mentioned $CO_2$-capture-material deterioration-state estimating processing can estimate the deterioration state of the $CO_2$ capture material in the $CO_2$ capture container 201 accurately and appropriately. The administrator of the exhaust-gas treatment equipment 100 can recognize the exchange timing of the $CO_2$ capture material according to the message displayed on the display device, enabling appropriate exchange of the $CO_2$ capture material. Thus, the exhaust-gas treatment equipment 100 can be operated efficiently and economically.

Figure 7A:
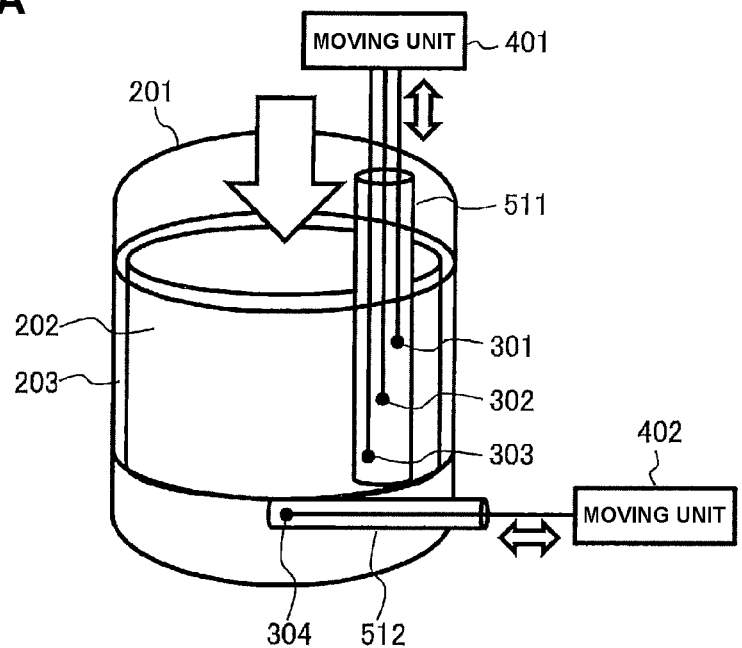
FIGS. 7A and 7B schematically illustrate an example of specific arrangement of the $CO_2$ capture material and the temperature measuring elements in the $CO_2$ capture container.
Figure 7B:
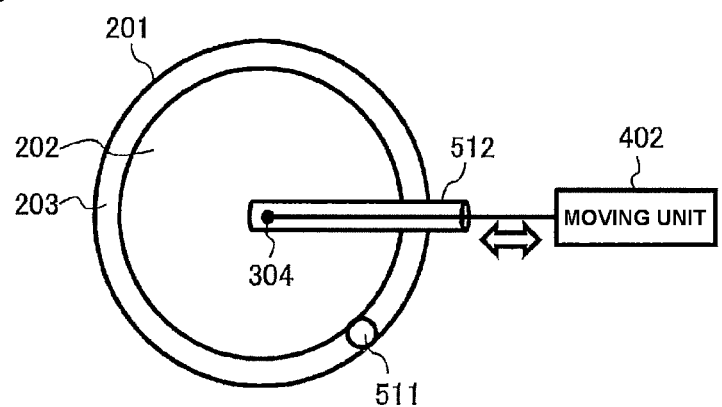

FIGS. 7A and 7B schematically illustrate an example of specific arrangement of the $CO_2$ capture material and the temperature measuring elements in the $CO_2$ capture container 201, FIG. 7A is a schematic perspective view, and FIG. 7B is a schematic bottom view. As illustrated in FIGS. 7A and 7B, a gas flowing portion 202 and a gas non-flowing portion 203 are provided in the $CO_2$ capture container 201. In this embodiment, the exhaust gas containing $CO_2$ flows in a direction represented by a block arrow in FIG. 7A, that is, from the top toward the bottom.

The gas flowing portion 202 is filled with the vertically-long columnar $CO_2$ capture material having a honeycomb cross section. The gas non-flowing portion 203 is provided with a sleeve pipe 511 vertically extending in the flowing direction of the exhaust gas, and is filled with a heat insulating material in the portion other than the sleeve pipe 511. The temperature measuring elements 301, 302, and 303 that can be vertically moved by the moving unit 401 are disposed in the sleeve pipe 511.

Preferably, the sleeve pipe 511 is constituted of a material having a high thermal conductivity, for example, a metal pipe. In this case, more preferably, openings for allowing the temperature measuring elements 301, 302, and 303 to directly contact or approach the $CO_2$ capture material are formed on contact places of the sleeve pipe 511 with the gas flowing portion 202 filled with the $CO_2$ capture material.

Further, in this example, a second sleeve pipe 512 is disposed below the bottom of the gas flowing portion 202, and extends from the center toward the outer circumference of the gas flowing portion 202. The temperature measuring element 304 that can be horizontally moved by the second moving unit 402 is disposed in the second sleeve pipe 512. Here, preferably, a lot of holes or openings are formed on the second sleeve pipe 512 except for the structure supporting the temperature measuring element 304. In this case, the gas emitted from the gas flowing portion 202 readily flows into the second sleeve pipe 512, the temperature of the gas can be accurately measured.

The second sleeve pipe 512, the temperature measuring element 304, and the second moving unit 402 are not essential. However, following effects can be expected by providing these constituents. That is, the computer that controls the exhaust-gas treatment equipment 100 can measure the temperature of the gas emitted from the gas flowing portion 202 while radially moving the temperature measuring element 304 by the moving unit 402 to acquire information on the radial change of the temperature of the exhaust gas. In the $CO_2$-capture-material deterioration-state estimating processing (see FIG. 6), the computer can appropriately correct the temperatures measured by the temperature measuring elements 301, 302, and 303 according to the information on the radial change of the temperature of the exhaust gas, thereby further improving the accuracy of estimating the deterioration state of the $CO_2$ capture material.

Examples of the temperature measuring elements 301 to 304 include thermocouples, thermistors, and radiation thermometers. However, considering that the temperature measuring elements are moved in the sleeve pipes 511, 512 in the $CO_2$ capture container 201, easily-miniaturized thermocouples or thermistors are preferable. Further, the temperature measuring elements 301 to 303 may directly contact the $CO_2$ capture material and however, does not preferably contact the $CO_2$ capture material to suppress wear of the capture material due to the movement.

In the embodiment described with reference to FIG. 1 to FIGS. 7A and 7B, the temperature of the $CO_2$ capture material in the $CO_2$ capture container 201 is measured by the three temperature measuring elements 301, 302, and 303. However, only one temperature measuring element 301 can perform the above-mentioned method of estimating the deterioration state of the $CO_2$ capture material. In this case, the temperatures of the $CO_2$ capture material at the three different material positions may be measured while vertically moving the temperature measuring element 301 along the flow of the exhaust gas by the moving unit 401. However, in this case, since the temperatures are measured at the positions with a slight time shift, as compared with the case of using the three temperature measuring elements 301, 302, and 303, the accuracy of the relationships between the material positions and temperatures becomes lower. However, a thermal capacity of the temperature measuring element 301 is sufficiently smaller than a thermal capacity of the $CO_2$ capture material, and time for movement of the temperature measuring element 301 via the moving unit 401 is sufficiently smaller than time for deterioration of the $CO_2$ capture material. Accordingly, even when only one temperature measuring element 301 is used, the deterioration state of the $CO_2$ capture material can be estimated with a practically enough accuracy.

As has been described, the exhaust-gas treatment equipment 100 in accordance with this embodiment can accurately estimate the deterioration state of the $CO_2$ capture material (gas capture material) using three temperature measuring elements or only one temperature measuring element.

<Extension of Embodiment>

The above-mentioned embodiment may be partially replaced with various embodiments. For example, the exhaust-gas treatment equipment 100 illustrated in FIG. 1 is equipment that recovers $CO_2$ from exhaust gas emitted from the boiler of the power plant and however, is not limited to such equipment. Accordingly, the exhaust gas is not limited to the exhaust gas from power plants, and may be exhaust gas from chemical plants, automobile exhaust gas, and synthesis gas. In this case, examples of components of the exhaust gas include $N_2$, $O_2$, $Co_2$, CO, hydrocarbon, smoke and dusts, $SO_x$, $No_x$, $H_2$, $CH_4$, and $H_2S$. That is, the exhaust-gas treatment equipment 100 only needs to remove or recover one of these components.

The $CO_2$ capture container 201 illustrated in FIG. 1 is filled with the $CO_2$ capture material. However, the $CO_2$ capture container 201 should be generally referred to as a reaction container, and the $CO_2$ capture material should be referred to as a gas capture material that captures a certain gas component.

The gas capture material used to capture gas, in particular, $CO_2$ and $H_2O$ may be any material, and may be metallic oxides, activated carbon, alkali metal carbonates, alkali metal hydroxides, layered composite hydroxides, and solid organic compounds. The $CO_2$ capture material may be a single-type $CO_2$ capture material or a combination of a plurality of types of $CO_2$ capture materials. One may be used as a carrier, while the other may be carried by impregnation or so on.

The metal oxide is preferably, a porous metal oxide, and more preferably, an oxide or a composite oxide containing at least one metal selected from Ce (selenium), a rare earth metal other than Ce, and Zr (zirconium). By using the composite oxide, the capture material can absorb $CO_2$ even after contact with $H_2O$, and $CO_2$ desorption temperature can be lowered. This is due to that, in the above-mentioned oxide, the surface of the oxide reacts with $H_2O$ to form a hydroxyl group (—OH), and by reaction of the functional group with $CO_2$, $CO_2$ can be absorbed on the surface in the form of hydrogencarbonate (—$CO_3H$).

Examples of the method of synthesizing the above-mentioned gas capture materials include impregnation method, mixing method, coprecipitation method, and sol-gel method. For example, a basic compound such as ammonia water, sodium hydroxide, or calcium hydroxide may be added to a solution containing a Ce nitrate to adjust pH to 7 to 10, precipitating the material. When an oxide is formed by precipitation, the oxide may be used as it is, or may be further oxidized by firing.

The gas capture material has any shape, and for example, may be shaped into powder, particle, pellet, honeycomb, and plate (monolith). When it is attempted to increase the reaction rate for gas capture, the powder, particle, or pellet-shaped gas capture material is preferable. When the amount of gas flowing in the reaction container is large and a pressure loss is easy to increase, honeycomb or plate-shaped gas capture material is preferable.

In the case of honeycomb-shaped gas capture material, a temperature measuring element may be installed in a honeycomb cell. However, in this case, the area of the openings of the honeycomb cell becomes smaller by the area of the installed temperature measuring element. As a result, the gas flow rate decreases at the site of the installed temperature measuring element, lowering the deterioration level of the gas capture material at the site due to flowing of poisoning gas lowers. That is, the accuracy of estimating the deterioration state of the gas capture material is considered to be degraded.

To reduce the effect of lowering of the gas flow rate, the diameter of the honeycomb cell including the temperature measuring element may be increased in advance, or the temperature measuring element may be installed on the outer circumferential face or non-gas flowing site of the honeycomb cell (for example, see FIGS. 7A and 7B). Alternatively, a temperature measuring element having a small diameter and a small cross-sectional area may be used. However, in this case, the strength of the measuring element decreases, which is unsuitable. Alternatively, the honeycomb cell may be hollowed to install the temperature measuring element therein. However, in this case, the strength of the honeycomb cell decreases.

Captured $CO_2$ may be desorbed from the gas capture material by heating, depressurization, or both of the gas capture material. In the embodiment described with reference to FIG. 1, the heating gas is circulated in the $CO_2$ capture container 201 (reaction container) to heat the $CO_2$ capture material, thereby desorbing $CO_2$. Alternatively, a heat transfer pipe that circulates a heated heat medium therein may indirectly heat the $CO_2$ capture material (gas capture material). In the case of depressurization, the reaction container may be depressurized by use of a pump or the like. In the case where both of heating and depressurization are performed, since depressurization decreases the gas-induced thermal conductivity to slow down the heating rate, heating is preferably performed prior to depressurization.

When the gas capture material is heated in the heating step and then, the gas capture material is reused, the gas capture material is cooled. As a cooling method, as described in the embodiment illustrated in FIG. 1, cooling gas (atmospheric air of room temperatures) may be circulated in the reaction container to cool the gas capture material, or a heat transfer pipe that circulates a coolant therein may indirectly cool the gas capture material.

When $CO_2$ is desorbed using the heated gas capture material, the capture, heating, and cooling steps may be switched in any suitable manner. For example, the position of the gas capture material in the reaction container is fixed, and gas supplied to the reaction container or an output of heating/cooling means is changed to switch the processes (fixed floor method). Alternatively, a space for each of the capture, heating, and cooling steps is decided, and the capture material is moved into the space to switch each process (fluid bed method or rotator method). When the capture material rotates as in the rotator method, preferably, the temperature measuring element is installed so as to hardly change with respect to rotation, for example, is located in the vicinity of a central axis of the rotator. In the case of using a thermocouple or thermistor as the temperature measuring element, the temperature measuring element may be coated with lubricating oil to prevent the breaking of a wire due to twisting.

The present invention is not limited to the above-mentioned embodiment and modification examples, and include other various modification examples. For example, the above-mentioned embodiment and modification examples describe the present invention in detail to facilitate understanding of the present invention, and do not necessarily include all of the described constituents. In addition, a portion of the configuration of any embodiment or modification example may be replaced with the configuration of another embodiment or modification example. Alternatively, the configuration of any embodiment or modification example may be combined with the configuration of another embodiment or modification example. Further, with respect to a portion of the configuration of each of the embodiment and modification examples, addition, deletion, and replacement of the configuration of another embodiment and modification example may be made.

REFERENCE SIGNS LIST

100: Exhaust-gas treatment equipment
101 to 105: Valve
201: $CO_2$ Capture container (Reaction container)
202: Gas flowing portion
203: Gas non-flowing portion 301 to 304: Temperature measuring element
401: Moving unit
402: Second moving unit
450: Control unit
501 to 503: Ventilator
511: Sleeve pipe
512: Second sleeve pipe
601 to 603: Condenser
701, 702: Compressor

The invention claimed is:

1. An exhaust-gas treatment equipment comprising:
a reaction container filled with a gas capture material that captures a particular gas component, the reactor container emitting gas obtained by removing the particular gas component from supplied gas by reaction of the supplied gas with the gas capture material;
a temperature measuring element disposed in the reaction container, the temperature measuring element measuring a temperature of the gas capture material in the reaction container;
a moving unit that freely moves the temperature measuring element in a direction that is parallel to a flow of the supplied gas flowing in the reaction container; and
a control unit that estimates a deterioration state of the gas capture material using temperatures of the gas capture material at a plurality of different positions in the reaction container, the temperatures being measured by the temperature measuring element when the temperature measuring element is moved by means of the moving unit.

2. The exhaust-gas treatment equipment according to claim 1, wherein
the reaction container comprises a heating unit that heats the gas capture material filled into the reaction container from outside, and a cooling unit that cools the gas capture material, and
a capturing step of causing the supplied gas to flow to allow the gas capture material to capture the particular gas component, a heating step of heating the gas capture material by the heating unit to desorb the particular gas component from the gas capture material, and a cooling step of cooling the heated gas capture material by the cooling unit are repeated in the reaction container.

3. The exhaust-gas treatment equipment according to claim 2, wherein
three of the temperature measuring elements are disposed in the reaction container to be movable in the direction that is parallel to the flow of the supplied gas, and
in the capturing step, the control unit estimates temperature distribution of the gas capture material along the flow of the supplied gas in the reaction container, from information on positions of the three temperature measuring elements located at different positions by the moving unit, and temperatures of the gas capture material, the temperatures being measured by the three temperature measuring elements at the positions, and estimates the deterioration state of the gas capture material based on the estimated temperature distribution.

4. The exhaust-gas treatment equipment according to claim 2, wherein
three of the temperature measuring elements are disposed in the reaction container to be movable in the direction that is parallel to the flow of the supplied gas, and the control unit
in the capturing step, estimates temperature distribution of the gas capture material along the flow of the supplied gas in the reaction container, from information on positions of the three temperature measuring elements located at different positions by the moving unit, and temperatures of the gas capture material, the temperatures being measured by the three temperature measuring elements at the positions, and calculates positions to which the three temperature measuring elements are to be moved based on the estimated temperature distribution, and
after moving the three temperature measuring elements to the calculated respective positions, estimates second temperature distribution of the gas capture material along the flow of the supplied gas in the reaction container, from information on positions of the three temperature measuring elements after the movement, and temperatures of the gas capture material, the temperatures being measured by the three temperature measuring elements at the positions after the movement, and estimates the deterioration state of the gas capture material based on the estimated second temperature distribution.

5. The exhaust-gas treatment equipment according to claim 4, wherein
the control unit displays a graph indicating the temperature distribution of the gas capture material along the flow of the supplied gas in the reaction container, on a display device.

6. The exhaust-gas treatment equipment according to claim 4, wherein
when estimating that most of the gas capture material has deteriorated based on the temperature distribution of the gas capture material along the flow of the supplied gas in the reaction container, the control unit displays an alarm message to prompt an exchange of the gas capture material on a display device.

7. The exhaust-gas treatment equipment according to claim 2, wherein
one of the temperature measuring element is disposed in the reaction container to be movable in the direction that is parallel to the flow of the supplied gas, and
in the capturing step, the control unit acquires temperatures of the gas capture material, the temperatures being measured by the temperature measuring element at least three different positions, while moving the temperature measuring element, estimates temperature distribution of the gas capture material along the flow of the supplied gas in the reaction container, from information on the at least three positions and temperatures of the gas capture material acquired at the respective positions, and estimate the deterioration state of the gas capture material based on the estimated temperature distribution.

8. The exhaust-gas treatment equipment according to claim 1, wherein
the gas capture material filled in the reaction container is a $CO_2$ capture material that captures $CO_2$.

9. The exhaust-gas treatment equipment according to claim 8, wherein
the $CO_2$ capture material uses at least one of a metallic oxide, activated carbon, an alkali metal carbonate, an alkali metal hydroxide, a layered composite hydroxide, and a solid organic compound.

10. The exhaust-gas treatment equipment according to claim 1, wherein a component of the gas capture material is an oxide or a composite oxide that contains at least one metal selected from Ce, a rare earth metal other than Ce, and Zr.

11. The exhaust-gas treatment equipment according to claim 1, wherein
the gas capture material is honeycomb-shaped or monolith-shaped.

12. The exhaust-gas treatment equipment according to claim 2, wherein
a pipe that supplies heated gas, as the heating unit, is connected to the reaction container.

13. The exhaust-gas treatment equipment according to claim 2, wherein
a heat transfer pipe through which a heated heat medium flows, as the heating unit, is provided in the reaction container.

14. A gas-capture-material deterioration-state estimating method, wherein
an exhaust-gas treatment equipment comprises:
a reaction container filled with a gas capture material that captures a particular gas component, the reactor container emitting gas obtained by removing the particular gas component from supplied gas by reaction of the supplied gas with the gas capture material;
a heating unit that heats the gas capture material; and
a cooling unit that cools the gas capture material, and repeats a process including:
a capturing step of causing the supplied gas to flow to allow the gas capture material to capture the particular gas component;
a heating step of heating the gas capture material by the heating unit to desorb the particular gas component from the gas capture material; and
a cooling step of cooling the heated gas capture material by the cooling unit,
the exhaust-gas treatment equipment further comprising:
a temperature measuring element disposed in the reaction container, the temperature measuring element measuring a temperature of the gas capture material in the reaction container;
a moving unit that freely moves the temperature measuring element in a direction that is parallel to a flow of the supplied gas flowing in the reaction container; and
a control unit connected to at least the moving unit and the temperature measuring element, wherein
the control unit estimates a deterioration state of the gas capture material using temperatures of the gas capture material at a plurality of different positions in the reaction container, the temperatures being measured by the temperature measuring element when the temperature measuring element is moved by means of the moving unit.

15. The gas-capture-material deterioration-state estimating method according to claim 14, wherein
three of the temperature measuring elements are disposed in the reaction container to be movable in the direction that is parallel to the flow of the supplied gas, and
in the capturing step, the control unit estimates temperature distribution of the gas capture material along the flow of the supplied gas in the reaction container, from information on positions of the three temperature measuring elements located at different positions by the moving unit, and temperatures of the gas capture material, the temperatures being measured by the three temperature measuring elements at the positions, and estimates the deterioration state of the gas capture material based on the estimated temperature distribution.

16. The gas-capture-material deterioration-state estimating method according to claim 14, wherein
three of the temperature measuring elements are disposed in the reaction container to be movable in the direction that is parallel to the flow of the supplied gas, and
the control unit
in the capturing step, estimates temperature distribution of the gas capture material along the flow of the supplied gas in the reaction container, from information on positions of the three temperature measuring elements located at different positions by the moving unit, and temperatures of the gas capture material, the temperatures being measured by the three temperature measuring elements at the positions, and calculates positions to which the three temperature measuring elements are to be moved based on the estimated temperature distribution, and
after moving the three temperature measuring elements to the calculated respective positions, estimates second temperature distribution of the gas capture material along the flow of the supplied gas in the reaction container, from information on positions of the three temperature measuring elements after the movement, and temperatures of the gas capture material, the temperatures being measured by the three temperature measuring elements at the positions after the movement, and estimates the deterioration state of the gas capture material based on the estimated second temperature distribution.

17. The gas-capture-material deterioration-state estimating method according to claim 16, wherein
the control unit displays a graph indicating the temperature distribution of the gas capture material along the flow of the supplied gas in the reaction container, on a display device.

18. The gas-capture-material deterioration-state estimating method according to claim 16, wherein
when estimating that most of the gas capture material has deteriorated based on the temperature distribution of the gas capture material along the flow of the supplied gas in the reaction container, the control unit displays an alarm message to prompt an exchange of the gas capture material on a display device.

19. The gas-capture-material deterioration-state estimating method according to claim 14, wherein
one of the temperature measuring element is disposed in the reaction container to be movable in the direction that is parallel to the flow of the supplied gas, and
in the capturing step, the control unit acquires temperatures of the gas capture material measured by the temperature measuring element at least three different positions while moving the temperature measuring element, estimates temperature distribution of the gas capture material along the flow of the supplied gas in the reaction container, from information on the at least three positions and temperatures of the gas capture material acquired at the respective positions, and estimates the deterioration state of the gas capture material based on the estimated temperature distribution.

* * * * *